J. LEE.
Farm Gate.
No. 55,876. Patented June 26, 1866.
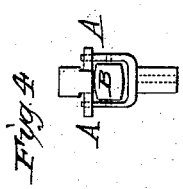
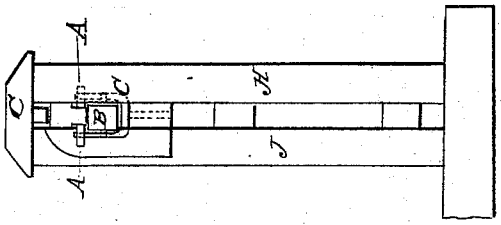
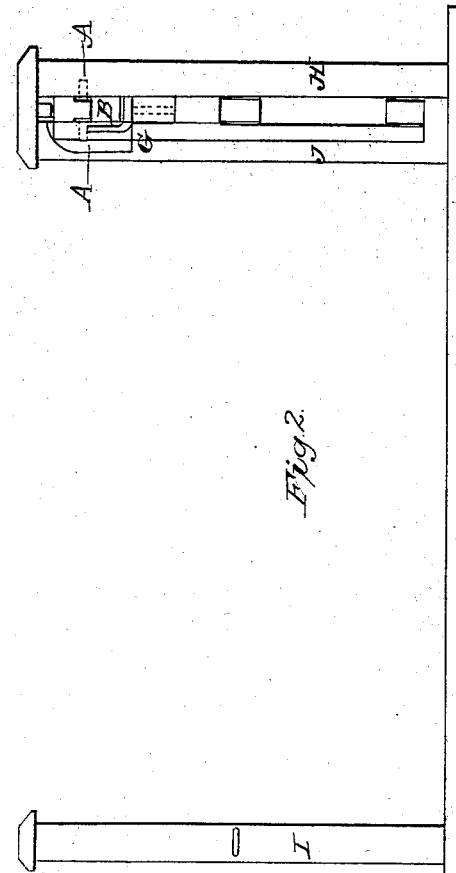
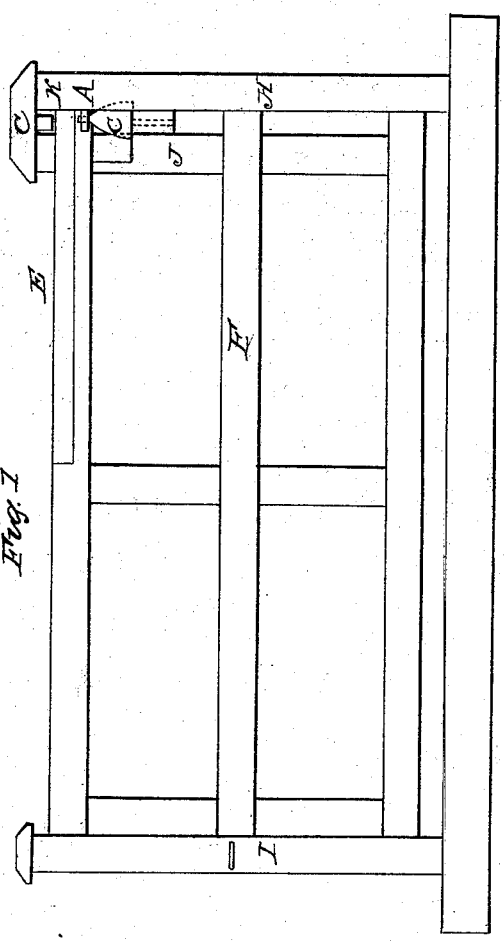
WITNESSES
H. H. Dixon
George Lee
INVENTOR
Joel Lee

UNITED STATES PATENT OFFICE.

JOEL LEE, OF GALESBURG, ILLINOIS.

IMPROVEMENT IN FARM-GATES.

Specification forming part of Letters Patent No. 55,876, dated June 26, 1866.

*To all whom it may concern:*

Be it known that I, JOEL LEE, of Galesburg, in the county of Knox and State of Illinois, have invented a new and useful Improvement in Farm-Gates; and I do hereby declare that the following is a full, clear, and exact description of the construction and operation of the same, reference being had to the annexed drawings, making a part of this specification, in which—

Figure 1 represents the gate shut; Fig. 2, the gate open. Fig. 3 is a sectional view; and Fig. 4 the three friction-rollers on a pivot.

A A represents the guide-rollers; B, the supporting-roll; C, the support for rollers A A and B; E, the strips to prevent the rolls from rising; F, the gate; G, the cap; H, fence or gate-post; I, fence-post; J, gate-stop; K, block.

The nature of my invention consists in furnishing friction-rollers A A to keep the gate on roller B.

To use my invention, block K is secured to post H, and the other side to gate-stop J, the block having a hole in its center for the reception of the pivot of the roller-support. The bar of the gate is placed on roller B in such a manner as to support the gate at the right height from the ground.

Friction-rollers A A, being on each side of gate bar, prevent the gate from getting off of the roller B.

When the gate is to be opened it is shoved back to near its center, and then turned at right angles with the fence.

The rollers A A not only keep the gate to its place, but permit it to be moved along without catching, as is the case sometimes when the guides are composed of metal without friction-rolls.

To shut the gate, it can be pulled while carrying it round, and the friction-rollers A A and B permit it to pass along smoothly as the roller-support turns on its pivot.

The gate may be secured to fence-post I by hook and staple or pin, as most convenient.

This gate needs no braces, neither is the gate-post liable to sag, as the pressure is perpendicular.

Having thus fully described my invention, what I claim as my invention, and desire to secure by Letters Patent, is—

1. The friction-rollers A A, when used as set forth and described.

2. The arrangement of rollers A A with the roller B and the roller-support C, all arranged as set forth and described.

JOEL LEE.

Witnesses:
H. A. DIXON,
GEORGE LEE.